(12) United States Patent
Ho

(10) Patent No.: US 6,938,264 B2
(45) Date of Patent: Aug. 30, 2005

(54) LASH-ELIMINATING DEVICE FOR WORM-AND-GEAR ASSEMBLY

(75) Inventor: Chi-Hwa Ho, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 244 days.

(21) Appl. No.: 10/356,585

(22) Filed: Feb. 3, 2003

(65) Prior Publication Data

US 2003/0147335 A1 Aug. 7, 2003

(30) Foreign Application Priority Data

Feb. 4, 2002 (TW) ....................................... 91101920 A

(51) Int. Cl.[7] ........................... G11B 7/08; G11B 7/085; G11B 7/09
(52) U.S. Cl. ..................................................... 720/665
(58) Field of Search ................................ 720/665, 664, 720/663, 659, 658; 74/425, 89.17, 413; 369/215, 215.1

(56) References Cited

U.S. PATENT DOCUMENTS 5,307,339 A * 4/1994 Tanaka ....................... 720/664
6,016,716 A * 1/2000 Mauro .......................... 74/409
6,639,760 B2 * 10/2003 Dyer et al. .............. 360/261.3

FOREIGN PATENT DOCUMENTS

JP         06-058375 A   *  3/1994

* cited by examiner

*Primary Examiner*—Julie Anne Watko
(74) *Attorney, Agent, or Firm*—Rabin & Berdo, P.C.

(57) ABSTRACT

A lash-eliminating device for a worm-and-gear assembly. The worm-and-gear assembly includes a worm and a worm gear engaged therewith. The lash-eliminating device comprises a base, a frame, a motor, and a biasing member. The worm gear is disposed on the base. The frame is disposed on the base in a rotatable manner. The motor is disposed in the frame, and includes an output shaft. The output shaft is connected to the worm. The biasing member is disposed on the base in a manner such that the biasing member abuts the frame. Thus, when the worm is rotated by the motor via the output shaft so as to rotate the worm gear, the frame is rotated by the biasing member so that the worm is moved relative to the worm gear to eliminate a lash between the worm and the worm gear.

31 Claims, 5 Drawing Sheets

LASH-ELIMINATING DEVICE FOR WORM-AND-GEAR ASSEMBLY

BACKGROUND OF THE INVENTION

1. Field of the Invention

The present invention relates to a lash-eliminating device for a worm-and-gear assembly, and in particular to an electronic device with a worm-and-gear assembly that can be accurately positioned at a low cost.

2. Description of the Related Art

In a feed mechanism of an electronic device, such as an optical disc drive, gears are mainly used as a transmission unit. To avoid interference between adjacent gears, a lash is formed between adjacent gears. However, the lash becomes a non-linear factor between a rotation of an output shaft of a motor of the optical disc drive and a movement of an optical pickup of the optical disc drive. Thus, the optical pickup is difficult to position accurately. Furthermore, when the optical disc drive is subjected to vibration, the lash becomes a source of free vibration so as to affect the position of the optical pickup. An additional biasing member is provided to reduce the lash between adjacent gears.

In an electronic device with low-noise requirements, such as an optical disc drive with high speed, a worm-and gear assembly is usually used as a feed mechanism since it is provided with low noise and high contact ratio. FIG. 1a and FIG. 1b show a conventional optical disc drive with a worm-and-gear assembly as a feed mechanism. In FIG. 1a and FIG. 1b, reference 11 represents a motor, reference 12 a worm, and reference 13 a worm gear. To simplify the figures, teeth of the worm 12 and the worm gear 13 are omitted. The shape of the worm-and-gear assembly is very complicated. Furthermore, when the worm-and-gear assembly is operated, it generates force in three directions; axial, radial, and tangential. In FIG. 1a, an arrow al represents the axial direction. In FIG. 1a and FIG. 1b, an arrow a2 represents the radial direction. In FIG. 1b, an arrow a3 represents the tangential direction. It is noted that the directions of the force in the axial direction al and the tangential direction a3 depend on the direction of the rotation of the worm 12. Thus, if the direction of the biasing force of the biasing member is the same as that of the operational worm, the worm and the worm gear jam. As a result, the difficulty of the design of the biasing member is increased.

A lash-eliminating device for a worm-and-gear assembly is often applied to a dividing plate. Referring to FIG. 2, the dividing plate includes two worms 25, 26. Power from a motor 21 is transmitted to a worm gear 24 via a one-way clutch 22 and a torsional restrainer 23. When the power is transmitted via one worm 25, the other worm 26 generates a force in an opposite direction so as to abut the worm gear 24 to eliminate the lash. However, since such mechanism includes two worms and a complicated switch unit, the cost is high. Furthermore, it is difficult to apply to electronic devices with limited space and weight, such as the optical disc drive.

It is noted that the invention is designed for electronic devices such as CD-R/RW, CDR/RW-DVD, and DVD-RW, requiring limited space and weight, and higher positional accuracy. Since the feed mechanism including spur gears has difficulty attaining high reduction ratio in a limited space, it is not applied thereto. In addition, in a conventional feed mechanism, a lashless leading screw is used. However, the cost of such feed mechanism is higher then other feed mechanism.

SUMMARY OF THE INVENTION

Accordingly, an object of the invention is to provide an electronic device with a worm-and-gear assembly that can be accurately positioned at a low cost in limited space.

Another object of the invention is to provide an electronic device, such as an optical disc drive, with a compact and low-noise feed mechanism.

The invention provides a lash-eliminating device for a worm-and-gear assembly. The worm-and-gear assembly includes a worm and a worm gear engaged therewith. The lash-eliminating device comprises a base, a frame, a motor, and a biasing member. The gear is disposed on the base. The frame is disposed on the base in a rotatable manner. The motor is disposed in the frame, and includes an output shaft. The output shaft is connected to the worm. The biasing member is disposed on the base in a manner such that it abuts the frame. Thus, when the worm is rotated by the motor via the output shaft so as to rotate the worm gear, the frame is rotated by the biasing member so that the worm is moved relative to the worm gear so as to eliminate a lash between the worm and the worm gear.

In a preferred embodiment, the lash-eliminating device further comprises a rotary shaft. The rotary shaft is disposed on the base in a manner such that the rotary shaft penetrates the frame. Thus, the frame is rotated relative to the base via the rotary shaft.

Furthermore, the frame includes a through hole for the rotary shaft to pass through, and the through hole is located away from the worm-and-gear assembly.

Furthermore, the worm has a first pitch circle, and the worm gear has a second pitch circle, and a tangent line of the first pitch circle and the second pitch circle penetrates a center of the rotary shaft.

In another preferred embodiment, the biasing member is a first compression spring, and the worm gear and the first compression spring are located on different sides of the worm so that the frame is rotated toward the worm gear via the first compression spring.

Furthermore, the base includes a flange, and the flange includes a protrusion, and the first compression spring is penetrated by the protrusion so that the first compression spring is disposed on the flange.

In another embodiment, the lash-eliminating device further comprises a first stopper and a second compression spring. The first stopper is disposed on the base. The second compression spring abuts the worm and the first stopper so that the worm is restrained in a predetermined range by the first stopper and the second compression spring.

In another embodiment, the lash-eliminating device further comprises a second stopper. The second stopper is disposed on the base so as to restrain the rotation of the frame.

Furthermore, the frame includes a plate for the second stopper to abut so that the frame is rotated relative to the base.

In the invention, an electronic device, such as an optical disc drive, is provided. The electronic device comprises a base, a worm-and-gear assembly, a frame, a motor, a moving unit, a transmission unit, and a biasing member. The worm-and-gear assembly includes a worm and a worm gear engaged therewith. The worm gear is disposed on the base. The frame is disposed on the base in a rotatable manner. The motor is disposed in the frame, and includes an output shaft. The output shaft is connected to the worm. The moving unit is disposed on the base in a moveable manner. The transmission unit connects to the moving unit and the worm-and-gear assembly respectively, and transmits a rotation of the motor into a movement so as to move the moving unit. The biasing member is disposed on the base in a manner such that the biasing member abuts the frame. Thus, when the worm is rotated by the motor via the output shaft so as to rotate the worm gear, the frame is rotated by the biasing member so that the worm is moved relative to the worm gear so as to eliminate a lash between the worm and the worm gear.

In a preferred embodiment, the electronic device further comprises a spur gear. The spur gear is connected to the transmission unit, and is rotated along with the worm gear of the worm-and-gear assembly in a synchronic manner.

Furthermore, the transmission unit is a rack engaging with the spur gear.

It is understood that the moving unit may be an optical pickup.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 3b is a schematic view of the assembled lash-eliminating device for a worm-and-gear assembly as shown in FIG. 3a.

DETAILED DESCRIPTION OF THE INVENTION

Figure 1A:
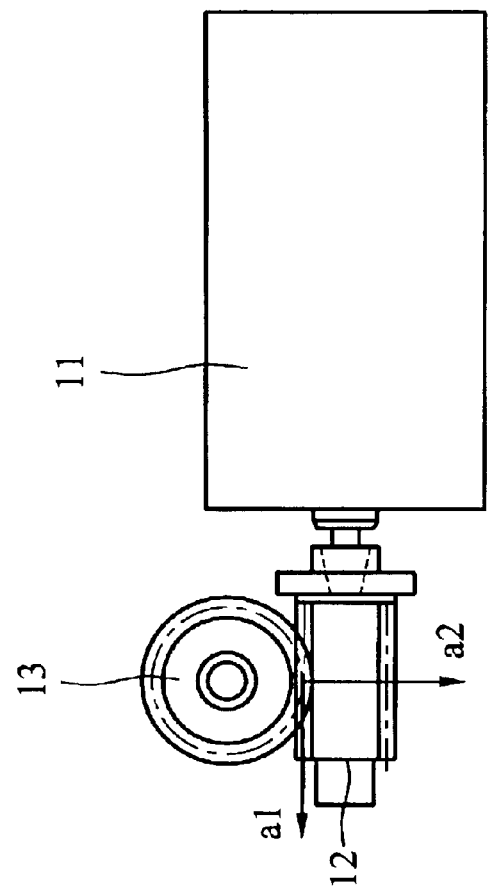
FIG. 1a and FIG. 1b are schematic views of a conventional optical disc drive, wherein a worm-and-gear assembly is used as a feed mechanism.
Figure 1B:
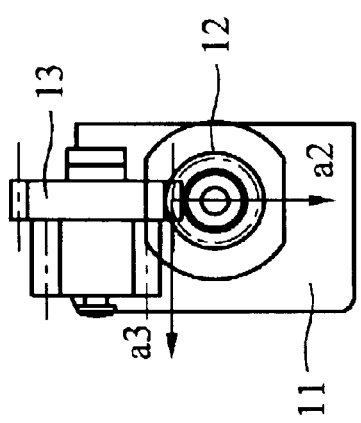
Figure 2:
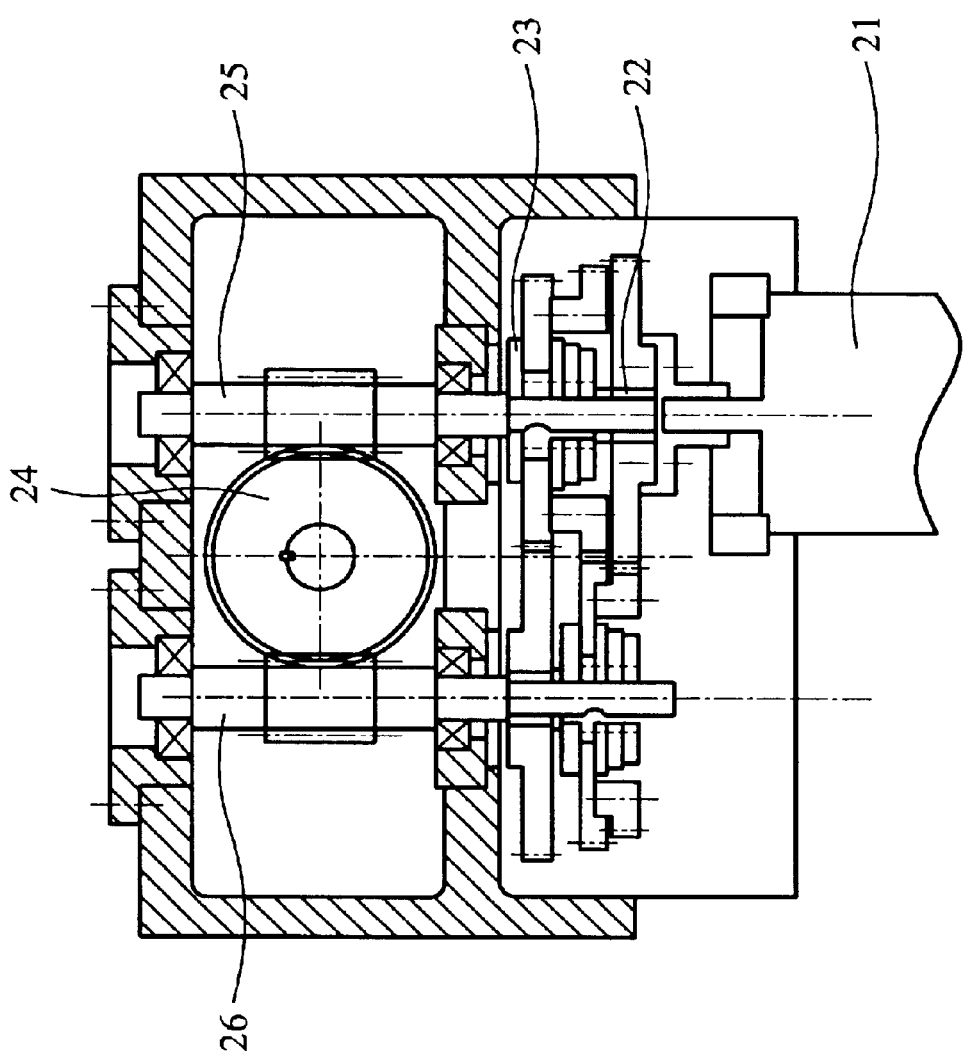
FIG. 2 is a schematic view of a dividing plate with a conventional lash-eliminating device.
Figure 3A:
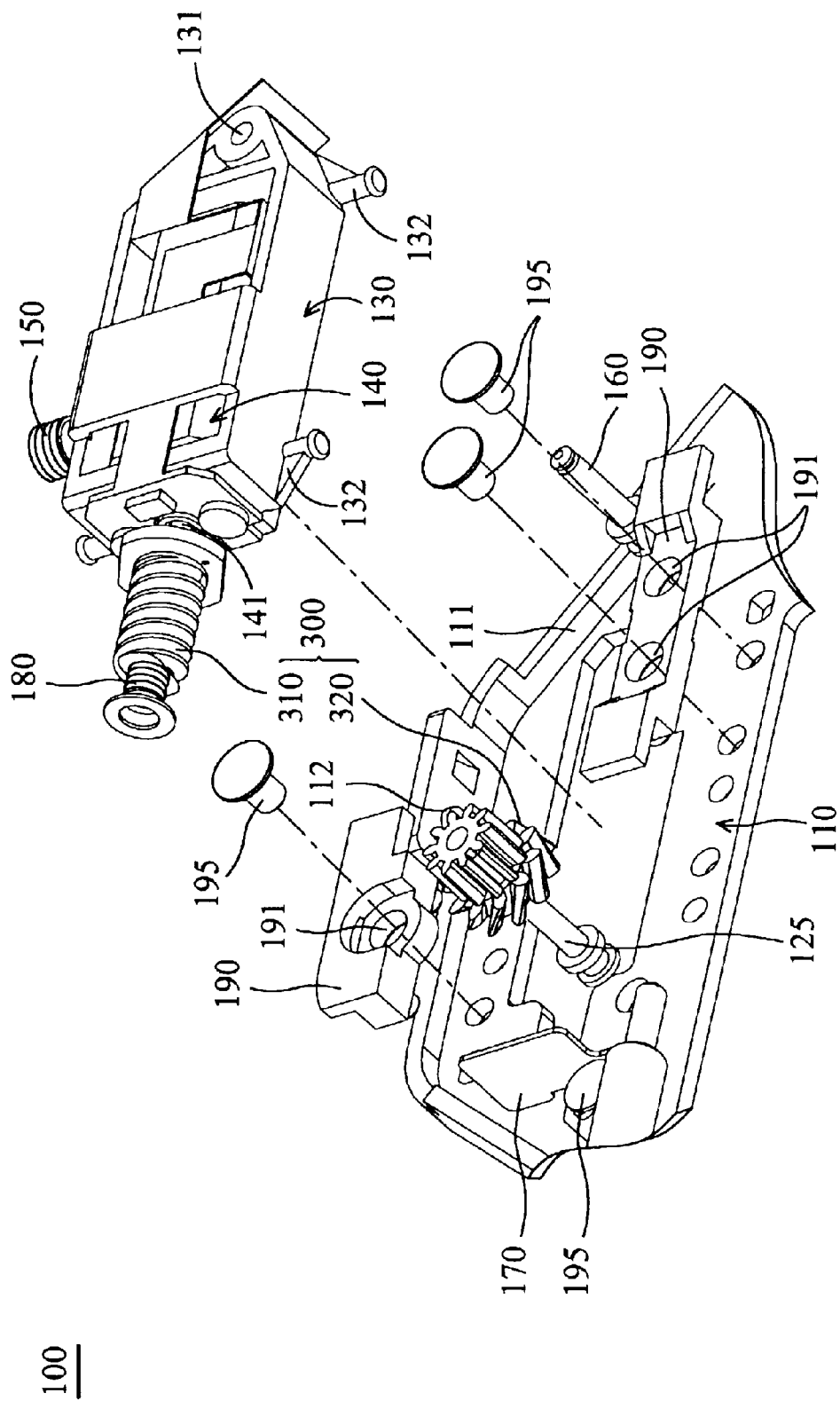
FIG. 3a is a partial exploded view of a lash-eliminating device for a worm-and-gear assembly as disclosed in the invention.
Figure 3B:
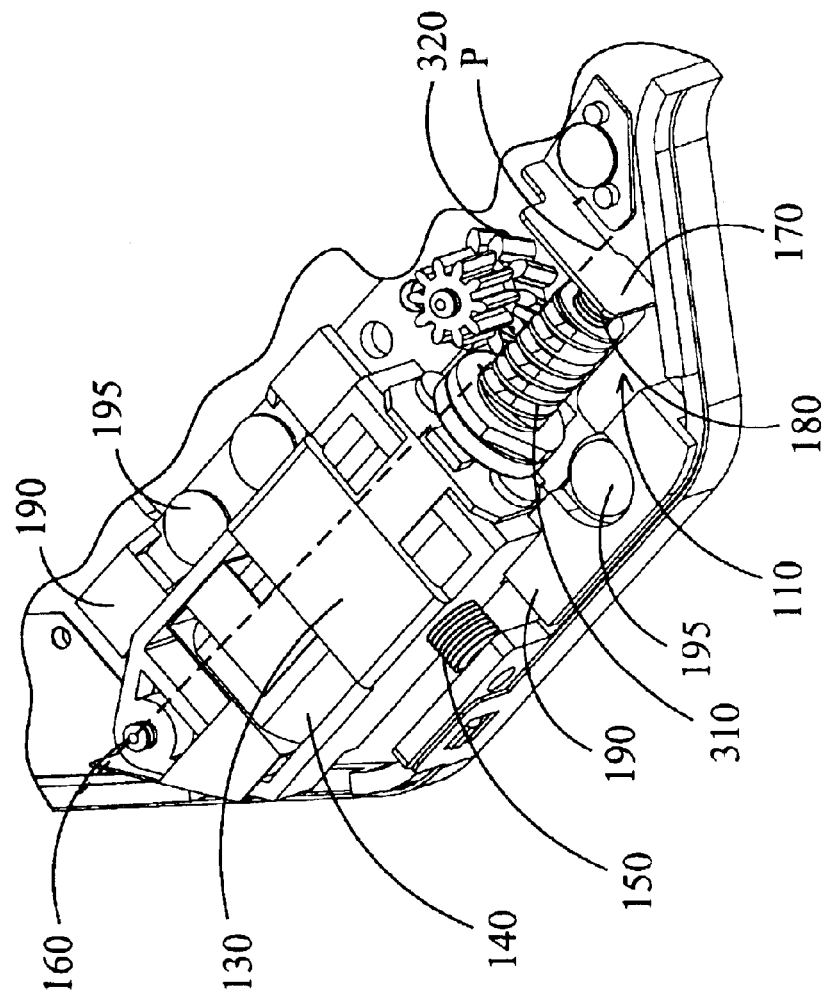

Referring to FIG. 3a and FIG. 3b, a lash-eliminating device 100, for a worm-and-gear assembly 300 of the invention is shown. The lash-eliminating device 100 comprises a base 110, a frame 130, a motor 140, a biasing member 150, a rotary shaft 160, a first stopper 170, a second compression spring 180, and two second stoppers 190.

The base 110 is a bottom member of the entire lash-eliminating device 100, and includes a flange 111 at its periphery. A protrusion 112 is formed on the flange 111. The worm-and-gear assembly 300 includes a worm 310 and a worm gear 320 engaging with the worm 310. The worm gear 320 is disposed on the base 110 via a rod 125.

The frame 130 is disposed on the base 110, and is rotated with respect to the rotary shaft 160. The frame 130 includes a through hole 131 for the rotary shaft 160 to pass through, and the through hole 131 is located at an end away from the worm-and-gear assembly 300. The frame 130 also includes four plates 132 at its corners for the second stoppers 190 to abut so that the frame 130 can only be slightly rotated relative to the base 110.

The motor 140 is used as a power source of the lash-eliminating device 100, and is disposed in the frame 130. The motor 140 includes an output shaft 141, and the output shaft 141 is connected to the worm 310. The biasing member 150 may be a first compression spring, and is disposed on the flange 111 of the base 110 in a manner such that the biasing member 150 abuts the frame 130. The worm gear 320 and the biasing member 150 are located on different sides of the worm 310 so that the frame 130 is rotated toward the worm gear 320 via the biasing member 150. It is noted that the protrusion 112 penetrates the biasing member 150.

The rotary shaft 160 is disposed on the base 110 in a manner such that the rotary shaft 160 penetrates the through hole 131 of the frame 130. Thus, when the motor 140 is operated, the frame 130 is slightly rotated on the base 110 with respect to the rotary shaft 160. Furthermore, the worm 310 has a first pitch circle, and the worm gear 320 has a second pitch circle. As shown in a dash line P of FIG. 3b, a tangent line of the first pitch circle and the second pitch circle may pass through a center of the rotary shaft 160. Thus, a rotational torque on the rotary shaft 160 due to an axial force on the worm 310 can be eliminated. As a result, a biasing torque may not be affected by the difference in the rotational direction of the worm 310.

The first stopper 170 is disposed on the base 110 via screws 195. The second compression spring 180 abuts the worm 310 at one end, and abuts the first stopper 170 at the other end so that the worm 310 is elastically restrained in a predetermined range of the axial direction by the first stopper 170 and the second compression spring 180.

The second stoppers 190 are disposed on the base 110 via screws 195 through its through holes 191 so as to restrain the rotation between the frame 130 and the base 110. It is noted that when the second stoppers 190 are abutted by the plates 132, a gap is formed between the second stopper 190 and the plate 132. Thus, the rotation of the frame 130 respective to the rotary shaft 160 is not affected.

Accordingly, when the worm 310 is rotated by the motor 140 via the output shaft 141 so as to rotate the worm gear 320, the frame 130 is rotated by the biasing member 150. Thus, the worm 310 is moved relative to the gear 320 so as to eliminate a lash between the worm 310 and the worm gear 320.

In this embodiment, the biasing member 150 is a compression spring, and the worm gear 320 and the biasing member 150 are located on different sides of the worm 310. Thus, the biasing member 150 can continuously provide a biasing force so as to rotate the frame 130 toward the worm gear 320. However, the biasing member is not limited to this. For example, the biasing member may be a tension spring located at the same side of the worm 310 as the worm gear 320 so as to attain the same effect.

Furthermore, in this embodiment, the motor 140 is disposed in the frame 130 by engagement, and the first stopper 170 and the second stoppers 190 are disposed on the base 110 via the screws respectively. However, the disposition of the above units is limited. For example, the first stopper and the second stopper may be welded to the base.

In addition, in this embodiment, the axial movement of the worm 310 is restrained by the first stopper 170 and the second compression spring 180. However, it is not limited as long as the same function can be attained. For example, an elastic member or thrust bearing can be used.

Figure 4:
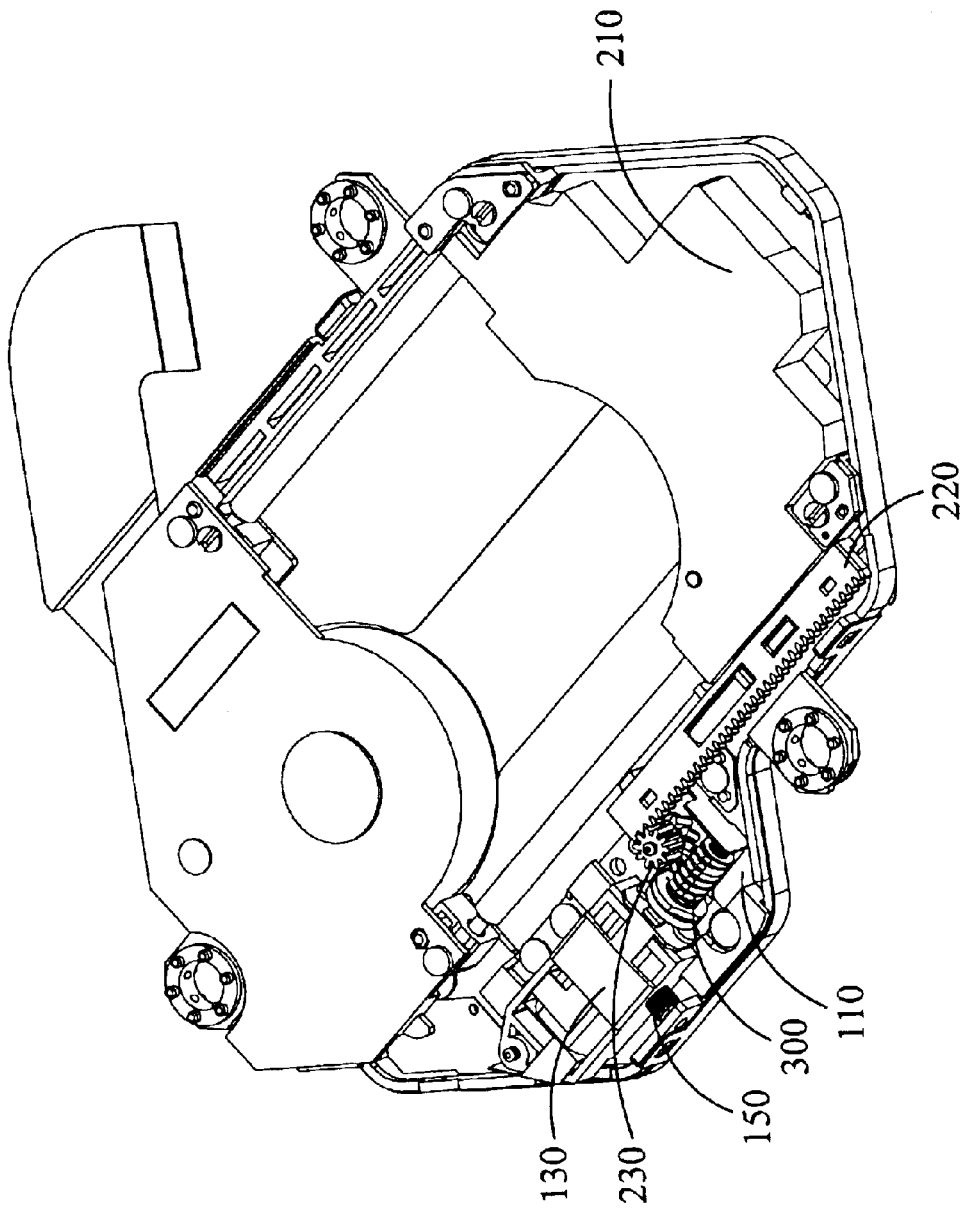
FIG. 4 is a schematic view of an electronic device with the lash-eliminating device for a worm-and-gear assembly as shown in FIG. 3b.

FIG. 4 is a schematic view of an electronic device 200 with the lash-eliminating device 100 as shown in FIG. 3b. In FIG. 4, an optical disc drive represents the electronic device. The electronic device (optical disc drive) 200 comprises the lash-eliminating device 100, a moving unit (optical pickup)

210, a transmission unit (rack) 220, and a spur gear 230. It is noted that the base 110 in FIG. 3a is used as a bottom part of the entire electronic device (optical disc drive) 200.

The spur gear 230 is disposed on the worm gear 320 of the worm-and-gear assembly 300, and is rotated along with the worm gear 320 of the worm-and-gear assembly 300 in a synchronic manner. The moving unit (optical pickup) 210 is disposed on the base 110 in a moveable manner. The transmission unit (rack) 220 is engaged with the moving unit (optical pickup) 210 and the spur gear 230 respectively. The transmission unit (rack) 220 transmits the rotation of the motor 140 into the movement so as to move the moving unit (optical pickup) 210.

Furthermore, to eliminate a lash between the spur gear 230 and the rack 220, the rack 220 may preferably be a double rack. Thus, there is no lash from the motor 140 to the moving unit (optical pickup) 210 in the entire feed mechanism.

In the optical pick 200 with the lash-eliminating device 100 as disclosed in the invention, the output shaft 141 of the motor 140, and the worm 310 of the worm-and-gear assembly 300 are connected with the rotary shaft 160 via the frame 130. The frame 130 is freely rotated respective to the rotary shaft 160. Furthermore, the biasing member 150 provides a rotational torque to bias the frame 130, the output shaft 141, and the worm 310 toward the worm gear 320. Thus, the lash can be eliminated. The biasing direction is a radial direction respective to a contact point between the worm 310 and the worm gear 320. Thus, no matter which rotational direction the worm 310 takes, the torque generated by the operation of the worm 310 is always contrary to the rotational torque provide by biasing member 130 of the worm 310. When the partial lash between the worm 310 and the worm gear 320 changes due to manufacture variation or the increase of radial force on the worm 310 due to torque fluctuation on output shaft 141, the worm 310 is automatically moved to or away from the worm gear 320 so that the worm-and-gear assembly 300 does not jam.

As stated above, the biasing torque is used in the invention so that the axial biasing force is generated between the worm and worm gear. Thus, the worm is biased toward the worm gear so as to eliminate the lash between the worm and the worm gear.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lash-eliminating device for a worm-and-gear assembly having a worm and a worm gear engaged therewith, comprising:
    a base on which the worm gear is disposed;
    a frame disposed on the base in a rotatable manner;
    a motor, disposed in the frame, having an output shaft, wherein the output shaft is connected to the worm;
    a biasing member disposed on the base in a manner such that the biasing member abuts the frame, whereby when the worm is rotated by the motor via the output shaft so as to rotate the worm gear, the frame is rotated by the biasing member so that the worm is moved relative to the worm gear so as to eliminate a lash between the worm and the worm gear.

2. The lash-eliminating device for a worm-and-gear assembly as claimed in claim 1, further comprising:
    a rotary shaft disposed on the base in a manner such that the rotary shaft penetrates the frame, whereby the frame is rotated relative to the base via the rotary shaft.

3. The lash-eliminating device for a worm-and-gear assembly as claimed in claim 2, wherein the frame includes a through hole for the rotary shaft to pass through, the through hole located away from the worm-and-gear assembly.

4. The lash-eliminating device for a worm-and-gear assembly as claimed in claim 2, wherein the worm has a first pitch circle, and the worm gear has a second pitch circle, and a tangent line of the first pitch circle and the second pitch circle penetrates a center of the rotary shaft.

5. The lash-eliminating device for a worm-and-gear assembly as claimed in claim 1, wherein the biasing member is a first compression spring, and the worm gear and the first compression spring are located on different sides of the worm so that the frame is rotated toward the worm gear via the first compression spring.

6. The lash-eliminating device for a worm-and-gear assembly as claimed in claim 5, wherein the base includes a flange, and the flange includes a protrusion, and the first compression spring is penetrated by the protrusion so that the first compression spring is disposed on the flange.

7. The lash-eliminating device for a worm-and-gear assembly as claimed in claim 1, further comprising:
    a first stopper disposed on the base; and
    a second compression spring abutting the worm and the first stopper so that the worm is restrained in a predetermined range by the first stopper and the second compression spring.

8. The lash-eliminating device for a worm-and-gear assembly as claimed in claim 1, further comprising:
    a second stopper, disposed on the base, for restraining the rotation of the frame.

9. The lash-eliminating device for a worm-and-gear assembly as claimed in claim 8, wherein the frame includes a plate for the second stopper to abut so that the frame is rotated relative to the base.

10. An electronic device comprising:
    a base;
    a worm-and-gear assembly having a worm and a worm gear engaged therewith, wherein the worm gear is disposed on the base;
    a frame disposed on the base in a rotatable manner;
    a motor, disposed in the frame, having an output shaft, wherein the output shaft is connected to the worm;
    a moving unit disposed on the base in a moveable manner;
    a transmission unit, connecting to the moving unit and the worm-and-gear assembly respectively, for transmitting a rotation of the motor into a movement so as to move the moving unit; and
    a biasing member disposed on the base in a manner such that the biasing member abuts the frame, whereby when the worm is rotated by the motor via the output shaft so as to rotate the worm gear, the frame is rotated by the biasing member so that the worm is moved relative to the worm gear so as to eliminate a lash between the worm and the worm gear.

11. The electronic device as claimed in claim 10, further comprising:
    a rotary shaft disposed on the base in a manner such that the rotary shaft penetrates the frame, whereby the frame is rotated relative to the base via the rotary shaft.

12. The electronic device as claimed in claim 11, wherein the frame includes a through hole for the rotary shaft to pass through, and the through hole is located away from the worm-and-gear assembly.

13. The electronic device as claimed in claim 11, wherein the worm has a first pitch circle, and the worm gear has a second pitch circle, and a tangent line of the first pitch circle and the second pitch circle penetrates a center of the rotary shaft.

14. The electronic device as claimed in claim 10, wherein the biasing member is a first compression spring, and the worm gear and the first compression spring are located on different sides of the worm so that the frame is rotated toward the worm gear via the first compression spring.

15. The electronic device as claimed in claim 14, wherein the base includes a flange, and the flange includes a protrusion, and the first compression spring is penetrated by the protrusion so that the first compression spring is disposed on the flange.

16. The electronic device as claimed in claim 10, further comprising:
    a first stopper disposed on the base; and
    a second compression spring abutting the worm and the first stopper so that the worm is restrained in a predetermined range by the first stopper and the second compression spring.

17. The electronic device as claimed in claim 10, further comprising:
    a second stopper, disposed on the base, for restraining the rotation of the frame.

18. The electronic device as claimed in claim 17, wherein the frame includes a plate for the second stopper to abut so that the frame is rotated relative to the base.

19. The electronic device as claimed in claim 10, further comprising:
    a spur gear, connecting to the transmission unit, rotating along with the worm gear of the worm-and-gear assembly in a synchronic manner.

20. The electronic device as claimed in claim 19, wherein the transmission unit is a rack engaging with the spur gear.

21. An optical disc drive comprising:
    a base;
    a worm-and-gear assembly having a worm and a worm gear engaged therewith, wherein the worm gear is disposed on the base;
    a frame disposed on the base in a rotatable manner;
    a motor, disposed in the frame, having an output shaft, wherein the output shaft is connected to the worm;
    an optical pickup disposed on the base in a moveable manner;
    a transmission unit, connecting to the optical pickup and the worm-and-gear assembly respectively, for transmitting a rotation of the motor into a movement so as to move the optical pickup; and
    a biasing member disposed on the base in a manner such that the biasing member abuts the frame, whereby when the worm is rotated by the motor via the output shaft so as to rotate the worm gear, the frame is rotated by the biasing member so that the worm is moved relative to the worm gear so as to eliminate a lash between the worm and the worm gear.

22. The optical disc drive as claimed in claim 21, further comprising:
    a rotary shaft disposed on the base in a manner such that the rotary shaft penetrates the frame, whereby the frame is rotated relative to the base via the rotary shaft.

23. The optical disc drive as claimed in claim 22, wherein the frame includes a through hole for the rotary shaft to pass through, and the through hole is located away from the worm-and-gear assembly.

24. The optical disc drive as claimed in claim 22, wherein the worm has a first pitch circle, and the worm gear has a second pitch circle, and a tangent line of the first pitch circle and the second pitch circle penetrates a center of the rotary shaft.

25. The optical disc drive as claimed in claim 21, wherein the biasing member is a first compression spring, and the worm gear and the first compression spring are located on different sides of the worm so that the frame is rotated toward the worm gear via the first compression spring.

26. The optical disc drive as claimed in claim 25, wherein the base includes a flange, and the flange includes a protrusion, and the first compression spring is penetrated by the protrusion so that the first compression spring is disposed on the flange.

27. The optical disc drive as claimed in claim 21, further comprising:
    a first stopper disposed on the base; and
    a second compression spring abutting the worm and the first stopper so that the worm is restrained in a predetermined range by the first stopper and the second compression spring.

28. The optical disc drive as claimed in claim 21, further comprising:
    a second stopper, disposed on the base, for restraining the rotation of the frame.

29. The optical disc drive as claimed in claim 28, wherein the frame includes a plate for the second stopper to abut so that the frame is rotated relative to the base.

30. The optical disc drive as claimed in claim 21, further comprising:
    a spur gear, connecting with the transmission unit, rotating along with the worm gear of the worm-and-gear assembly in a synchronic manner.

31. The optical disc drive as claimed in claim 30, wherein the transmission unit is a rack engaging with the spur gear.

* * * * *